Jan. 24, 1967 R. F. GRANT ETAL 3,300,558
METHOD OF REMOVING THE CELL WALLS OF A RESILIENT
CELLULAR FILTER MATERIAL
Filed July 19, 1963
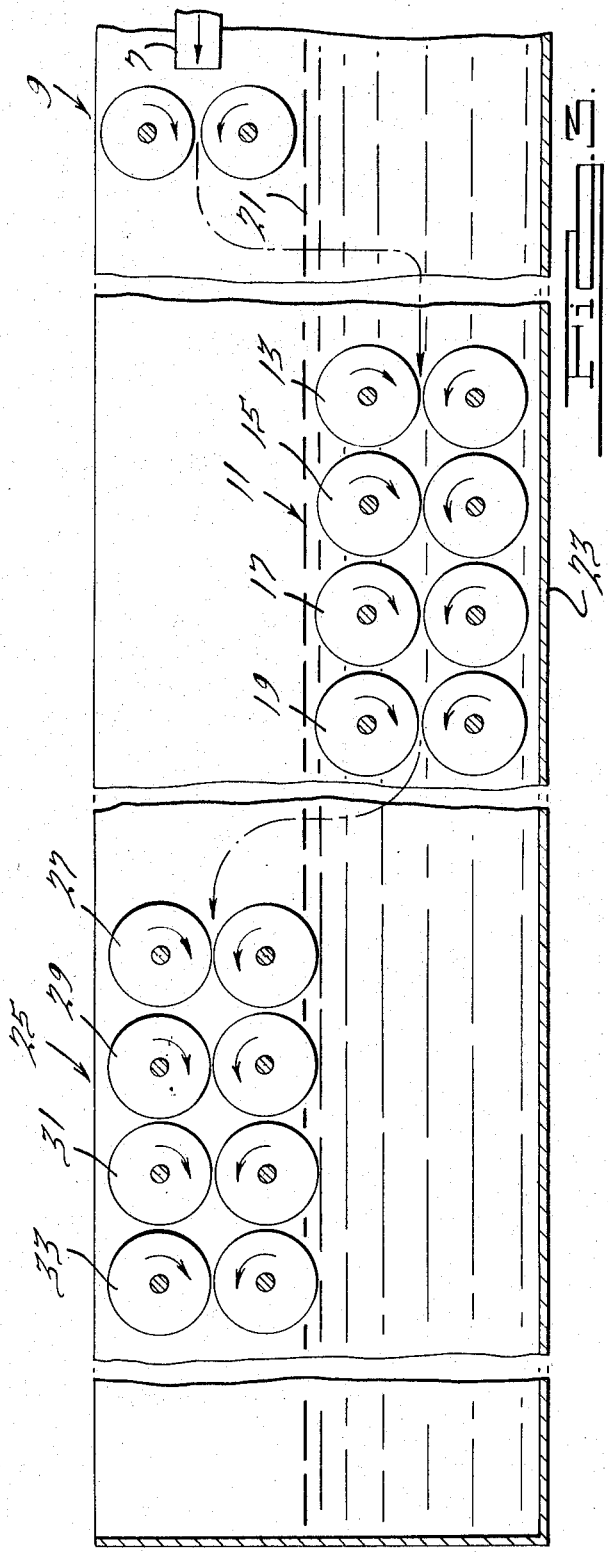
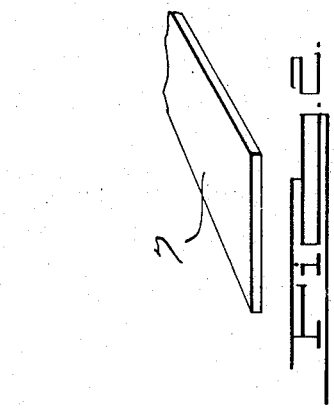
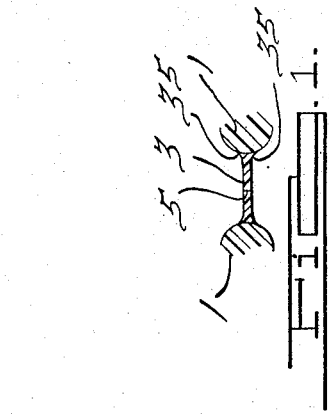
INVENTORS:
Robert F. Grant
Richard V. Jensen
BY
Carness, Dickey & Pierce
ATTORNEYS 3,300,558
METHOD OF REMOVING THE CELL WALLS OF A RESILIENT CELLULAR FILTER MATERIAL
Robert F. Grant, Milwaukee, and Richard V. Jensen, Racine, Wis., assignors to Walker Manufacturing Company, a corporation of Delaware
Filed July 19, 1963, Ser. No. 296,258
8 Claims. (Cl. 264—321)

This invention relates primarily to filter materials, especially air and gas filter materials; and, in particular, concerns a process for providing such materials with the proper porosity.

It is an object of this invention to provide a non-chemical process for obtaining proper porosity in resilient cellular filter materials.

According to the invention, a combination of mechanical crushing and water pressure is used to rupture and remove the cell walls of cellular material so as to obtain consistent, uniform, and maximum cell openings.

The invention is illustrated schematically in the accompanying drawing in which:

FIGURE 1 shows an enlarged view of a portion of a foamed plastic cell;

FIG. 2 shows a strip of foam ready for treatment by means of the invention; and

FIG. 3 is a longitudinal section through roller crushing apparatus for carrying out the invention.

A popular resilient cellular filter material is plastic foam which consists of a flexible, substantially polyhedral cellular structure represented schematically in FIG. 1. The cells comprise relatively heavy column or frame members 1; and in the foam as originally produced there are thin cell walls 3 extending between most, if not all, adjacent columns 1. The walls 3 may or may not have ruptures 5 therein when the foam is produced. Such ruptures provide openings for the flow of fluid from one cell to another. Foam is often considered "open-celled" if a sufficient number of walls 3 have ruptures 5 to permit fluid to flow from one cell to another in a foam piece. Such foam, however, is not suitable for use as a filter because there may be too much variation from one piece to another, because the presence of the cell walls 3 causes too much back pressure, and because the pressure drop along various paths that fluid may follow in flowing through the foam filter is not uniform. In order to overcome these difficulties and render the foam more suitable for use in filters, it is considered necessary to treat the foam in such a way as to remove the cell walls 3, leaving only a random network of columns 1 which can trap particles to be filtered out of a fluid and yet interpose only a minimum resistance to flow of fluid. Heretofore, the treatment for removing the walls 3 has been chemical or chemical-mechanical in nature. United States Patent No. 2,961,710 describes such a process.

The present invention provides a means for removing the cell walls 3 without the inconvenience or expense involved in using chemicals, such as a NaOH, to dissolve or weaken the foam.

In accoordance with the invention, the foam may be processed in suitably shaped strips, such as the strip 7 shown in FIG. 2. It is preferable that the foam be open-celled in the sense that a large percentage of the cell walls 3 contain ruptures 5. To insure an optimum degree of cell wall rupture the foam strip 7 is preferably passed in dry condition through a set of rolls 9. The purpose of this step, if required, is to rupture enough cell walls so that each cell of the foam strip may be filled with water. The strip is then submerged in water and compressed so that upon release the vacuum in the cells will draw the water into the cells. Visual observation of the foam will tell whether all the cells are full of water. The water filled foam is then passed through a wet crush roller assembly 11 comprising a series of preferably four pairs of rollers 13, 15, 17, and 19 which are preferably submerged in water 21 in a tank 23 so that the foam cells remain full of water at all times as the strip 7 passes through the wet crush assembly 11. The foam strip 7 is then passed through a dry crush roller assembly 25 comprising a series of preferably four pairs of rollers 27, 29, 31, and 33. The bottoms of the lower rollers preferably contact the surface of the water 23 so that they pick up water to lubricate passage of the foam through the rollers 25.

The treatment, therefore, comprises four basic steps:

A. Dry crushing in rolls 9, if necessary, to rupture enough cell walls so that all cells may be filled with water. It is desirable to apply this step, for the sake of uniformity, even if the foam prior to treatment generally exhibits a high degree of cell wall rupture.

B. Loading all the cells with water as by compressing and releasing under water.

C. Passing through wet crush rollers 11.

D. Passing through dry crush rollers 25.

As an example, a ¾" expanded thickness strip of open-cell polymeric polyether polyurethane foam, available on the open market, was treated in accordance with the above process. All rolls were similar to clothes wringers, cylindrical, of hard rubber, and 2⅝" diameter. Rollers 9 were manually turned at low speed for the initial dry crush and there was a clearance of about .020" between the upper and lower rolls. The rollers in assemblies 11 and 25 were rotated at a high speed of 600 r.p.m. (412⅓ ft./min.). The upper and lower rolls in pairs 13, 17, 27, and 31 were preset to a clearance of .008" and there was a preset clearance of .003" between the upper and lower rolls in pairs 15, 19, 29, and 33. Slack or elasticity in each of the roll pairs permitted a spread between upper and lower rolls as the foam passed through the rolls to a roll clearance of .010–.012" between the upper and lower rollers. The adjacent pairs of rolls in assemblies 11 and 25 were placed as close together (horizontally) as possible. Steps B and C were repeated six times and then step D was repeated ten times. The call walls were all removed by this treatment.

Experiments have shown that the equipment described above will open up to 18 p.s.i. tensile foam having a thickness of ½" to 1". The speed of the rolls in assemblies 11 and 25 can vary plus or minus 10% from 600 r.p.m. for such foam and thickness. If the foam is of lower than about 13 p.s.i. tensile strength the initial clearance between the rolls in assemblies 11 and 25 should be increased to as much as .012" to prevent shredding. The initial clearance can be determined easily by backing off the rolls just enough to prevent shredding or tearing of the foam. Higher roll speeds (higher linear velocities) may be used to help open the higher tensile foams so long as shredding does not occur. Also, the number of passes in steps B and C or step D can be increased to improve opening or decreased if proper opening is obtained. While tensile strength and hardness are some indication whether foam can be opened by the present process, the chemical structure of the foam is important and will permit some foams at a given tensile strength to be opened whereas different foams at the same tensile strength cannot feasibly be opened by this process.

The key step in the present treatment of the foam is step C, the wet crush. The water filled ruptured cells are longitudinally stretched greatly due to the combination of a high degree of transverse compression and high linear velocity which causes considerable variation in stress across the thickness of the foam, the center of the foam being dragged behind the outside as the strip goes through the rolls. The trapped water acts dynamically to exert tremendous pressures on the cell walls and they shear or rupture at their junctures 35 with the columns. Continued alternating compression in the rolls and partial expansion between adjacent rolls eventually tears the walls away from the columns to open the cells the maximum amount. The alternating compression and expansion while the foam is stretched to different degrees longitudinally is believed to materially improve the speed and effectiveness of wall removal as it provides for fatigue and stress concentration at junctures 35.

The degree of compression of the foam, as indicated in the above example, must be very high—as high as possible without foam shredding. It is preferred that the initial clearance of the rolls be about 0.2 to 0.4% of the expanded foam thickness and that spring-back in the rolls be such that the actual clearance as the foam passes between the rolls be about 1.2 to 2.4% of the expanded foam thickness.

In equipment for mass production treatment of foam according to this invention, it is anticipated that wall ruptured, water filled foam will be passed through a wet crush assembly containing many more than four pairs of rolls. In such case, it may be possible to eliminate the subsequent dry crush and obtain complete wall removal in a sufficiently long pass through only the wet crush rollers.

Modifications may be made without departing from the spirit and scope of the invention.

We claim:
1. The method of removing cell walls from columns in resilient cellular filter material, said material having ruptured cell walls so that the cells can be filled with water, which comprises filling all the cells of the material with water and simultaneously stretching and compressing the cells by passing the material in strip form through a set of rolls so as to materially raise the pressure of the water in the columns of the cells and thereby shear and tear the cell walls from the filter material.

2. The method of claim 1 wherein said rolls have a linear velocity of about 370 to 450 feet per minute and said material has an expanded thickness of about ¾ inch and a tensile strength of about 13–18 p.s.i., said rolls compressing said material to a thickness of about .012 inch.

3. The method of claim 1 wherein said material is foamed polyether polyurethane.

4. The method of removing the cell walls of resilient foamed polyether polyurethane material or the like having cell walls attacked to columns which comprises passing a flat strip of the material while dry through a set of compression rolls to rupture the cell walls, filling the cells with water, and passing the material while filled with water through a set of high speed wet crush compression rolls to mechanically and hydraulically fracture the cell walls and shear them from the columns.

5. The method of claim 4 including the step of passing the material leaving the wet crush rolls through a set of high speed dry crush rolls.

6. The invention set forth in claim 4 wherein said wet crush rolls are set to an initial clearance of about 0.2 to 0.4% of the expanded thickness of the material and spring back during the passage of the material to a spacing of about 1.2 to 2.4% of the expanded thickness of the material.

7. The method of claim 4 wherein said material is passed through said wet crush compression rolls while submerged in water and including the step of removing the material from the water after leaving the wet crush rolls and passing it through a set of high speed dry crush rolls.

8. The method of removing cell walls from columns in resilient foamed polyurethane material of up to about 18 p.s.i. tensile strength which comprises passing the material through a set of crushing rolls while dry to rupture the cell walls, submerging the material in water and filling the cells with water and passing the material while submerged through a set of crushing rolls, and then removing the material from the water and passing it through a set of crushing rolls while outside the water.

References Cited by the Examiner

UNITED STATES PATENTS

| | | | |
|---|---|---|---|
| 1,045,234 | 11/1912 | Willis et al. | 264—321 XR |
| 2,961,710 | 11/1960 | Stark | 264—321 XR |
| 3,060,137 | 10/1962 | Gemeinhardt et al. | 264—321 XR |
| 3,171,820 | 3/1965 | Volz | 264—321 XR |
| 3,194,854 | 7/1965 | Smith | 264—321 XR |
| 3,196,975 | 7/1965 | Voelker | 264—321 XR |
| 3,239,585 | 3/1966 | Karporvich | 264—321 XR |

ALEXANDER H. BRODMERKEL, *Primary Examiner*

P. E. ANDERSON, *Assistant Examiner.*